(12) United States Patent
Banerjee et al.

(10) Patent No.: US 11,676,061 B2
(45) Date of Patent: Jun. 13, 2023

(54) HARNESSING MACHINE LEARNING AND DATA ANALYTICS FOR A REAL TIME PREDICTIVE MODEL FOR A FCC PRE-TREATMENT UNIT

(71) Applicant: Honeywell International Inc., Morris Plains, NJ (US)

(72) Inventors: Soumendra Mohan Banerjee, New Delhi (IN); Deepak Bisht, New Delhi (IN); Krishna Mani, Gurgaon (IN); Priyesh Jayendrakumar Jani, Gurgaon (IN); Gautam Pandey, Gurgaon (IN)

(73) Assignee: Honeywell International Inc., Charlotte, NC (US)

( * ) Notice: Subject to any disclaimer, the term of this patent is extended or adjusted under 35 U.S.C. 154(b) by 1289 days.

(21) Appl. No.: 16/151,086

(22) Filed: Oct. 3, 2018

(65) Prior Publication Data

US 2019/0108454 A1    Apr. 11, 2019

Related U.S. Application Data

(60) Provisional application No. 62/568,746, filed on Oct. 5, 2017.

(51) Int. Cl.
    *G06N 20/00*     (2019.01)
    *G06F 17/15*     (2006.01)
    *C10G 11/18*     (2006.01)

(52) U.S. Cl.
    CPC ............. *G06N 20/00* (2019.01); *G06F 17/15* (2013.01); *C10G 11/187* (2013.01)

(58) Field of Classification Search
    CPC ....... G06N 20/00; G06F 17/15; C10G 11/187; G05B 13/041; G05B 17/02
    See application file for complete search history.

(56) References Cited

U.S. PATENT DOCUMENTS

| 4,380,146 A | 4/1983 | Yannone .................... 60/39.281 |
| 4,775,460 A | 10/1988 | Reno |
| 4,795,545 A | 1/1989 | Schmidt |
| 5,077,252 A | 12/1991 | Owen et al. .................... 502/43 |

(Continued)

FOREIGN PATENT DOCUMENTS

| EP | 2746884 A1 | 6/2014 | ............. G05B 23/02 |
| EP | 2801937 | 11/2014 | |

(Continued)

OTHER PUBLICATIONS

International Preliminary Report on Patentability for PCT/US2018/054607, dated Apr. 8, 2020.

(Continued)

*Primary Examiner* — Randy Boyer
*Assistant Examiner* — Juan C Valencia

(57) ABSTRACT

This disclosure provides an apparatus and method for harnessing machine learning and data analytics for a real-time predictive model for a FCC pre-treatment unit. The method includes collecting operating parameters of a pre-treatment unit and fluid catalytic cracking (FCC) unit; evaluating an independent variable of the operating parameters; and adjusting an input to the pre-treatment unit to control the independent variable within specifications in an output of the FCC unit.

11 Claims, 3 Drawing Sheets

(56) References Cited

U.S. PATENT DOCUMENTS

| | | | |
|---|---|---|---|
| 5,605,435 A | 2/1997 | Haugen | 137/514 |
| 5,666,297 A | 9/1997 | Britt et al. | 364/578 |
| 5,817,517 A | 10/1998 | Perry et al. | |
| 6,038,540 A | 3/2000 | Krist et al. | 705/8 |
| 6,392,114 B1 | 5/2002 | Shields et al. | 582/719 |
| 6,760,716 B1 | 7/2004 | Ganesamoorthi et al. | 706/21 |
| 6,772,044 B1 | 8/2004 | Mathur et al. | 700/204 |
| 6,795,798 B2 | 9/2004 | Eryurek et al. | 702/188 |
| 7,006,889 B2 | 2/2006 | Mathur et al. | 700/204 |
| 7,067,333 B1 | 6/2006 | Pasadyn et al. | 438/5 |
| 7,133,807 B2 | 11/2006 | Karasawa | 702/188 |
| 7,151,966 B1 | 12/2006 | Baier et al. | 700/19 |
| 7,246,039 B2 | 7/2007 | Moorhouse | 702/185 |
| 7,313,447 B2 | 12/2007 | Hsuing et al. | 700/9 |
| 7,415,357 B1 | 8/2008 | Stluka et al. | 702/6 |
| 7,567,887 B2 | 7/2009 | Emigholz et al. | 702/182 |
| 7,742,833 B1 | 6/2010 | Herbst et al. | 700/108 |
| 7,877,596 B2 | 1/2011 | Foo Kune et al. | 713/153 |
| 7,925,979 B2 | 4/2011 | Forney et al. | 715/733 |
| 7,936,878 B2 | 5/2011 | Kune et al. | 380/270 |
| 7,979,192 B2 | 7/2011 | Morrison et al. | |
| 7,995,526 B2 | 8/2011 | Liu et al. | 370/329 |
| 8,050,889 B2 | 11/2011 | Fluegge et al. | 702/182 |
| 8,055,371 B2 | 11/2011 | Sanford et al. | 700/108 |
| 8,111,619 B2 | 2/2012 | Liu et al. | 370/229 |
| 8,204,717 B2 | 6/2012 | McLaughlin et al. | 702/188 |
| 8,244,384 B2 | 8/2012 | Pachner et al. | 700/30 |
| 8,280,057 B2 | 10/2012 | Budampati et al. | 380/270 |
| 8,352,049 B2 | 1/2013 | Hsiung et al. | |
| 8,385,436 B2 | 2/2013 | Holm et al. | 375/260 |
| 8,428,067 B2 | 4/2013 | Budampati et al. | 370/395.21 |
| 8,458,778 B2 | 6/2013 | Budampati et al. | 726/6 |
| 8,571,064 B2 | 10/2013 | Kore et al. | 370/469 |
| 8,644,192 B2 | 2/2014 | Budampati et al. | 370/255 |
| 8,811,231 B2 | 8/2014 | Budampati et al. | 370/255 |
| 8,923,882 B2 | 12/2014 | Gandhi et al. | 455/455 |
| 9,134,717 B2 | 9/2015 | Trnka | |
| 9,166,667 B2 | 10/2015 | Thanikachalam | |
| 9,176,498 B2 | 11/2015 | Baramov | |
| 9,751,817 B2 | 9/2017 | Jani et al. | |
| 9,864,823 B2 | 1/2018 | Horn et al. | |
| 9,968,899 B1 | 5/2018 | Gellaboina et al. | |
| 10,095,200 B2 | 10/2018 | Horn et al. | |
| 10,107,295 B1 | 10/2018 | Brecheisen | |
| 10,180,680 B2 | 1/2019 | Horn et al. | |
| 10,183,266 B2 | 1/2019 | Victor et al. | |
| 10,222,787 B2 | 3/2019 | Romatier et al. | |
| 10,328,408 B2 | 6/2019 | Victor et al. | |
| 2002/0123864 A1 | 9/2002 | Eryurek et al. | 702/188 |
| 2002/0179495 A1 | 12/2002 | Heyse et al. | 208/137 |
| 2003/0147351 A1 | 8/2003 | Greenlee | 370/232 |
| 2004/0079392 A1 | 4/2004 | Kuechler | 134/22.19 |
| 2004/0099572 A1 | 5/2004 | Evans | 208/113 |
| 2004/0109788 A1 | 6/2004 | Li et al. | 422/3 |
| 2004/0204775 A1 | 10/2004 | Keyes | 705/30 |
| 2004/0220689 A1 | 11/2004 | Mathur et al. | 700/97 |
| 2004/0220778 A1 | 11/2004 | Imai et al. | 702/188 |
| 2005/0027721 A1 | 2/2005 | Saenz | 707/100 |
| 2005/0009033 A1 | 5/2005 | Mallavarapu et al. | 95/96 |
| 2005/0216209 A1 | 9/2005 | Evans | 702/45 |
| 2006/0020423 A1 | 1/2006 | Sharpe, Jr. | 702/183 |
| 2006/0133412 A1 | 6/2006 | Callaghan | 370/465 |
| 2006/0259163 A1 | 11/2006 | Hsiung et al. | 700/30 |
| 2007/0020154 A1 | 1/2007 | Evans | 422/3 |
| 2007/0059159 A1 | 3/2007 | Hjerpe | 415/117 |
| 2007/0059838 A1 | 3/2007 | Morrison et al. | 436/55 |
| 2007/0091824 A1 | 4/2007 | Budampati et al. | 370/255 |
| 2007/0091825 A1 | 4/2007 | Budampati et al. | 370/255 |
| 2007/0185664 A1 | 8/2007 | Tanaka | 702/56 |
| 2007/0192078 A1 | 8/2007 | Nasle et al. | 703/14 |
| 2007/0212790 A1 | 9/2007 | Welch et al. | |
| 2007/0250292 A1 | 10/2007 | Alagappan et al. | 702/184 |
| 2007/0271452 A1 | 11/2007 | Foo Kune et al. | 713/150 |
| 2008/0078693 A1* | 4/2008 | Sexton | C10G 11/187 208/120.1 |
| 2008/0086322 A1 | 4/2008 | Wallace | 705/1 |
| 2008/0130902 A1 | 6/2008 | Foo Kune et al. | 380/286 |
| 2008/0217005 A1 | 9/2008 | Stluka et al. | 166/250.01 |
| 2008/0282606 A1 | 11/2008 | Plaza et al. | |
| 2009/0059786 A1 | 3/2009 | Budampati et al. | 370/230 |
| 2009/0060192 A1 | 3/2009 | Budampati et al. | 380/270 |
| 2009/0064295 A1 | 3/2009 | Budampati et al. | 726/6 |
| 2009/0201899 A1 | 8/2009 | Liu et al. | 370/338 |
| 2009/0245286 A1 | 10/2009 | Kore et al. | 370/475 |
| 2009/0268674 A1 | 10/2009 | Liu et al. | 370/329 |
| 2010/0014599 A1 | 1/2010 | Holm et al. | 375/260 |
| 2010/0108567 A1 | 5/2010 | Medoff | 208/49 |
| 2010/0125347 A1 | 5/2010 | Martin et al. | 700/31 |
| 2010/0158764 A1 | 6/2010 | Hedrick | 422/134 |
| 2010/0230324 A1 | 9/2010 | Al-Alloush et al. | |
| 2010/0262900 A1 | 10/2010 | Romatier et al. | 715/219 |
| 2011/0112659 A1 | 5/2011 | Pachner et al. | 700/29 |
| 2011/0152590 A1 | 6/2011 | Sadler et al. | 585/313 |
| 2011/0152591 A1 | 6/2011 | Sadler et al. | 585/313 |
| 2011/0311014 A1 | 12/2011 | Hottovy et al. | 376/283 |
| 2012/0029966 A1 | 2/2012 | Cheewakriengkrai et al. | |
| 2012/0083933 A1 | 4/2012 | Subbu et al. | 700/291 |
| 2012/0095808 A1 | 4/2012 | Kattapuram et al. | 705/7.37 |
| 2012/0104295 A1 | 5/2012 | Do et al. | 251/129.01 |
| 2012/0121376 A1 | 5/2012 | Huis in Het Veld | 415/1 |
| 2012/0123583 A1 | 5/2012 | Hazen et al. | |
| 2012/0197616 A1 | 8/2012 | Trnka | 703/6 |
| 2012/0232870 A1* | 9/2012 | Devereux | G05B 17/02 703/9 |
| 2012/0259583 A1 | 10/2012 | Noboa et al. | |
| 2013/0029587 A1 | 1/2013 | Gandhi et al. | 455/7 |
| 2013/0079899 A1 | 3/2013 | Baramov | 700/32 |
| 2013/0090088 A1 | 4/2013 | Chevsky et al. | 455/411 |
| 2013/0094422 A1 | 4/2013 | Thanikachalam | 370/312 |
| 2013/0253898 A1 | 9/2013 | Meagher et al. | 703/18 |
| 2013/0270157 A1 | 10/2013 | Ferrara | 208/48 AA |
| 2013/0311437 A1 | 11/2013 | Stluka et al. | 707/706 |
| 2014/0026598 A1 | 1/2014 | Trawicki | 62/56 |
| 2014/0074273 A1 | 3/2014 | Mohideen et al. | 700/98 |
| 2014/0114039 A1 | 4/2014 | Benham et al. | 526/348.5 |
| 2014/0131027 A1 | 5/2014 | Chir | 165/300 |
| 2014/0163275 A1 | 6/2014 | Yanagawa et al. | 585/319 |
| 2014/0179968 A1 | 6/2014 | Yanagawa et al. | 585/476 |
| 2014/0212978 A1 | 7/2014 | Sharpe, Jr. et al. | 436/6 |
| 2014/0294683 A1 | 10/2014 | Siedler | 422/129 |
| 2014/0294684 A1 | 10/2014 | Siedler | 422/129 |
| 2014/0296058 A1 | 10/2014 | Sechrist et al. | 502/53 |
| 2014/0309756 A1 | 10/2014 | Trygstad | 700/31 |
| 2014/0337256 A1 | 11/2014 | Varadi et al. | 706/12 |
| 2015/0059714 A1 | 3/2015 | Bernards | 123/568.11 |
| 2015/0077263 A1 | 3/2015 | Ali et al. | 340/679 |
| 2015/0078970 A1 | 3/2015 | Iddir et al. | 422/218 |
| 2015/0098862 A1 | 4/2015 | Lok et al. | 422/49 |
| 2015/0158789 A1 | 6/2015 | Keusenkothen | |
| 2015/0185716 A1 | 7/2015 | Wichmann et al. | 700/287 |
| 2015/0276208 A1 | 10/2015 | Maturana et al. | 700/274 |
| 2015/0330571 A1 | 11/2015 | Beuneken | 141/4 |
| 2016/0033941 A1 | 2/2016 | T et al. | 700/81 |
| 2016/0098037 A1 | 4/2016 | Zornio et al. | 700/20 |
| 2016/0147204 A1 | 5/2016 | Wichmann et al. | 700/287 |
| 2016/0237910 A1 | 8/2016 | Saito | |
| 2016/0260041 A1 | 9/2016 | Horn et al. | |
| 2016/0291584 A1 | 10/2016 | Horn et al. | |
| 2016/0292188 A1 | 10/2016 | Horn et al. | |
| 2016/0292325 A1 | 10/2016 | Horn et al. | |
| 2017/0009932 A1 | 1/2017 | Oh | |
| 2017/0058213 A1 | 3/2017 | Oprins | 585/303 |
| 2017/0082320 A1 | 3/2017 | Wang | |
| 2017/0284410 A1 | 10/2017 | Sharpe, Jr. | |
| 2017/0315543 A1 | 11/2017 | Horn et al. | |
| 2017/0323038 A1 | 11/2017 | Horn et al. | |
| 2017/0352899 A1 | 12/2017 | Asai | |
| 2018/0046155 A1 | 2/2018 | Horn et al. | |
| 2018/0081344 A1 | 3/2018 | Romatier et al. | |
| 2018/0082569 A1 | 3/2018 | Horn et al. | |
| 2018/0121581 A1 | 5/2018 | Horn et al. | |
| 2018/0122021 A1 | 5/2018 | Horn et al. | |
| 2018/0155638 A1 | 6/2018 | Al-Ghamdi | 208/79 |
| 2018/0155642 A1 | 6/2018 | Al-Ghamdi et al. | |

(56) References Cited

U.S. PATENT DOCUMENTS

| | | |
|---|---|---|
| 2018/0197350 A1 | 7/2018 | Kim |
| 2018/0275690 A1 | 9/2018 | Lattanzio et al. |
| 2018/0275691 A1 | 9/2018 | Lattanzio et al. |
| 2018/0275692 A1 | 9/2018 | Lattanzio et al. |
| 2018/0280914 A1 | 10/2018 | Victor et al. |
| 2018/0280917 A1 | 10/2018 | Victor et al. |
| 2018/0282633 A1 | 10/2018 | Van de Cotte et al. |
| 2018/0282634 A1 | 10/2018 | Van de Cotte et al. |
| 2018/0282635 A1 | 10/2018 | Van de Cotte et al. |
| 2018/0283368 A1 | 10/2018 | Van de Cotte et al. |
| 2018/0283392 A1 | 10/2018 | Van de Cotte et al. |
| 2018/0283404 A1 | 10/2018 | Van de Cotte et al. |
| 2018/0283811 A1 | 10/2018 | Victor et al. |
| 2018/0283812 A1 | 10/2018 | Victor et al. |
| 2018/0283813 A1 | 10/2018 | Victor et al. |
| 2018/0283815 A1 | 10/2018 | Victor et al. |
| 2018/0283816 A1 | 10/2018 | Victor et al. |
| 2018/0283818 A1 | 10/2018 | Victor et al. |
| 2018/0284705 A1 | 10/2018 | Van de Cotte et al. |
| 2018/0286141 A1 | 10/2018 | Van de Cotte et al. |
| 2018/0311609 A1 | 11/2018 | McCool et al. |
| 2018/0362862 A1 | 12/2018 | Gellaboina et al. |
| 2018/0363914 A1 | 12/2018 | Faiella et al. |
| 2018/0364747 A1 | 12/2018 | Charr et al. |
| 2019/0002318 A1 | 1/2019 | Thakkar et al. |
| 2019/0003978 A1 | 1/2019 | Shi et al. |
| 2019/0015806 A1 | 1/2019 | Gellaboina et al. |
| 2019/0041813 A1 | 2/2019 | Horn et al. |
| 2019/0083920 A1 | 3/2019 | Bjorklund et al. |
| 2019/0101336 A1 | 4/2019 | Victor et al. |
| 2019/0101342 A1 | 4/2019 | Victor et al. |
| 2019/0101907 A1 | 4/2019 | Charr et al. |
| 2019/0108454 A1 | 4/2019 | Baneijee et al. |
| 2019/0120810 A1 | 4/2019 | Kumar Kn et al. |
| 2019/0151814 A1 | 5/2019 | Victor et al. |
| 2019/0155259 A1 | 5/2019 | Romatier et al. |

FOREIGN PATENT DOCUMENTS

| | | |
|---|---|---|
| WO | WO 2001/060951 | 8/2001 |
| WO | WO 2009/046095 | 4/2009 |
| WO | WO 2014/042508 | 3/2014 |
| WO | WO 2014/123993 | 8/2014 |
| WO | WO 2016/141128 | 9/2016 |

OTHER PUBLICATIONS

U.S. Appl. No. 15/058,658, filed Mar. 3, 2015, Ian G. Horn Zak Alzein Paul Kowalczyk Christophe Romatier, System and Method for Managing Web-Based Refinery Performance Optimization Using Secure Cloud Computing.

U.S. Appl. No. 15/640,120, filed Mar. 30, 2015, Ian G. Horn Zak Alzein Paul Kowalczyk Christophe Romatier, Evaluating Petrochemical Plant Errors to Determine Equipment Changes for Optimized.

U.S. Appl. No. 15/851,207, filed Mar. 27, 2017, Louis A. Lattanzio Alex Green Ian G. Horn Matthew R. Wojtowicz, Operating Slide Valves in Petrochemical Plants or Refineries.

U.S. Appl. No. 15/851,343, filed Dec. 21, 2017, Louis A. Lattanzio Alex Green Ian G. Horn Matthew R. Wojtowicz, Early Prediction and Detection of Slide Valve Sticking in Petrochemical Plants or Refineries.

U.S. Appl. No. 15/851,360, filed Mar. 27, 2017, Louis A. Lattanzio Alex Green Ian G. Horn Matthew R. Wojtowicz, Measuring and Determining Hot Spots in Slide Valves for Petrochemical Plants or Refineries.

U.S. Appl. No. 15/853,689, filed Mar. 30, 2015, Ian G. Horn Zak Alzein Paul Kowalczyk Christophe Romatier, Cleansing System for a Feed Composition Based on Environmental Factors.

U.S. Appl. No. 15/858,767, filed Dec. 28, 2017, Ian G. Horn Zak Alzein Paul Kowalczyk Christophe Romatier, Chemical Refinery Performance Optimization.

U.S. Appl. No. 15/899,967, filed Feb. 20, 2018, Joel Kaye, Developing Linear Process Models Using Reactor Kinetic Equations.

U.S. Appl. No. 15/935,827, filed Mar. 28, 2017, Michael R. Van de Cotte Ian G. Horn, Rotating Equipment in a Petrochemical Plant or Refinery.

U.S. Appl. No. 15/935,847, filed Mar. 28, 2017, Michael R. Van de Cotte Ian G. Horn, Rotating Equipment in a Petrochemical Plant or Refinery.

U.S. Appl. No. 15/935,872, filed Mar. 28, 2017, Michael R. Van de Cotte Ian G. Horn, 3744early Surge Detection of Rotating Equipment in a Petrochemical Plant or Refinery.

U.S. Appl. No. 15/935,898, filed Mar. 28, 2017, Michael R. Van de Cotte Ian G. Horn, Reactor Loop Fouling Monitor for Rotating Equipment in a Petrochemical Plant or Refinery.

U.S. Appl. No. 15/935,920, filed Mar. 28, 2017, Michael R. Van de Cotte Ian G. Horn, Sensor Location for Rotating Equipment in a Petrochemical Plant or Refinery.

U.S. Appl. No. 15/935,935, filed Mar. 28, 2017, Michael R. Van de Cotte Ian G. Horn, Determining Quality of Gas for Rotating Equipment in a Petrochemical Plant or Refinery.

U.S. Appl. No. 15/935,950, filed Mar. 28, 2017, Michael R. Van de Cotte Ian G. Horn, Determining Quality of Gas for Rotating Equipment in a Petrochemical Plant or Refinery.

U.S. Appl. No. 15/935,957, filed Mar. 28, 2017, Michael R. Van de Cotte Ian G. Horn, Using Molecular Weight and Invariant Mapping to Determine Performance of Rotating Equipment in a Petrochemical Plant or Refinery.

U.S. Appl. No. 15/937,484, filed Mar. 28, 2017, Sanford A. Victor Phillip F. Daly Ian G. Horn, Detecting and Correcting Maldistribution in Heat Exchangers in a Petrochemical Plant or Refinery.

U.S. Appl. No. 15/937,499, filed Mar. 28, 2017, Sanford A. Victor Phillip F. Daly Ian G. Horn, Detecting and Correcting Cross-Leakage in Heat Exchangers in a Petrochemical Plant or Refinery.

U.S. Appl. No. 15/937,517, filed Mar. 28, 2017, Sanford A. Victor Phillip F. Daly Ian G. Horn, Strain Gauges and Detecting Pre-Leakage in Heat Exchangers in a Petrochemical Plant or Refinery.

U.S. Appl. No. 15/937,535, filed Mar. 28, 2017, Sanford A. Victor Phillip F. Daly Ian G. Horn, Detecting and Correcting Thermal Stresses in Heat Exchangers in a Petrochemical Plant or Refinery.

U.S. Appl. No. 15/937,588, filed Mar. 28, 2017, Sanford A. Victor Phillip F. Daly Ian G. Horn, Detecting and Correcting Problems in Liquid Lifting in Heat Exchangers.

U.S. Appl. No. 15/937,602, filed Mar. 28, 2017, Sanford A. Victor Phillip F. Daly Ian G. Horn, Air-Cooled Heat Exchangers.

U.S. Appl. No. 15/937,614, filed Mar. 28, 2017, Sanford A. Victor Phillip F. Daly Ian G. Horn, Wet-Cooled Heat Exchanger.

U.S. Appl. No. 15/937,624, filed Mar. 28, 2017, Sanford A. Victor Phillip F. Daly Ian G. Horn, Heat Exchangers in a Petrochemical Plant or Refinery.

U.S. Appl. No. 15/963,840, filed Apr. 28, 2017, Ryan McCool Chad E. Bjorklund Jorge Charr Luk Verhulst, Remote Monitoring of Adsorber Process Units.

U.S. Appl. No. 15/972,974, filed Jun. 20, 2017, Jorge Charr Kevin Carnes Ralph Davis Donald A. Eizenga Christina L. Haasser James W. Harris Raul A. Ohaco Daliah Papoutsis, Incipient Temperature Excursion Mitigation and Control.

U.S. Appl. No. 15/979,421, filed May 14, 2018, Mahesh K. Gellaboina Louis A. Lattanzio, Catalyst Transfer Pipe Plug Detection.

U.S. Appl. No. 16/007,669, filed Jun. 28, 2017, Yili Shi Daliah Papoutsis Jonathan Andrew Tertel, Process and Apparatus to Detect Mercaptans in a Caustic Stream.

U.S. Appl. No. 16/011,600, filed Jun. 19, 2017, Theodore Peter Faiella Colin J. Deller Raul A. Ohaco, Remote Monitoring of Fired Heaters.

U.S. Appl. No. 16/011,614, filed Jun. 19, 2017, Mahesh K. Gellaboina Michael Terry Seth Huber Danielle Schindlbeck, Catalyst Cycle Length Prediction Using Eigen Analysis.

U.S. Appl. No. 16/015,579, filed Jun. 28, 2017, Killol H. Thakkar Robert W. Brafford Eric C. Tompkins, Process and Apparatus for Dosing Nutrients to a Bioreactor.

U.S. Appl. No. 16/133,623, filed Sep. 18, 2017, Chad E. Bjorklund Jeffrey Guenther Stephen Kelley Ryan McCool, Remote Monitoring of Pressure Swing Adsorption Units.

(56) References Cited

OTHER PUBLICATIONS

U.S. Appl. No. 16/140,770, filed Oct. 20, 2017, Dinesh Kumar KN Soumendra Mohan Banerjee, System and Method to Optimize Crude Oil Distillation or Other Processing by Inline Analysis of Crude Oil Properties.

U.S. Appl. No. 16/148,763, filed Oct. 2, 2017, Jorge Chan Bryan J. Egolf Dean E. Rende Mary Wier Guy B. Woodle Carol Zhu, Remote Monitoring of Chloride Treaters Using a Process Simulator Based Chloride Distribution Estimate.

U.S. Appl. No. 16/151,086, filed Oct. 5, 2017, Soumendra Mohan Banerjee Deepak Bisht Priyesh Jayendrakumar Jarti Krishna Mani Gautam Pandey, Harnessing Machine Learning & Data Analytics for a Real Time Predictive Model for a Fcc Pre-Treatment Unit.

U.S. Appl. No. 16/154,138, filed Oct. 8, 2018, Raul A. Ohaco Jorge Charr, High Purity Distillation Process Control With Multivariable and Model Predictive Control (Mpc) and Fast Response Analyzer.

U.S. Appl. No. 16/154,141, filed Oct. 8, 2018, Ian G. Horn Zak Alzein Paul Kowalczyk Christophe Romatier, System and Method for Improving Performance of a Plant With a Furnace.

U.S. Appl. No. 16/215,101, filed Dec. 10, 2018, Louis A. Lattanzio Christopher Schindlbeck, Delta Temperature Control of Catalytic Dehydrogenation Process Reactors.

U.S. Appl. No. 16/252,021, filed Sep. 16, 2016, Christophe Romatier Zak Alzein Ian G. Horn Paul Kowalczyk David Rondeau, Petrochemical Plant Diagnostic System and Method for Chemical Process Model Analysis.

U.S. Appl. No. 16/253,181, filed Mar. 28, 2017, Ian G. Horn Phillip F. Daly Sanford A. Victor, Detecting and Correcting Vibration in Heat Exchangers.

U.S. Appl. No. 16/363,406, filed Mar. 30, 2018, Louis A. Lattanzio Abhishek Pednekar, Catalytic Dehydrogenation Reactor Performance Index.

WO App. PCT/US2018/054607: International Search Report and Written Opinion (dated Jan. 31, 2019).

\* cited by examiner

HARNESSING MACHINE LEARNING AND DATA ANALYTICS FOR A REAL TIME PREDICTIVE MODEL FOR A FCC PRE-TREATMENT UNIT

CROSS-REFERENCE TO RELATED APPLICATION AND PRIORITY CLAIM

This application claims priority under 35 U.S.C. § 119(e) to U.S. Provisional Patent Application No. 62/568,746 filed on Oct. 5, 2017. This provisional application is hereby incorporated by reference in its entirety.

TECHNICAL FIELD

This disclosure relates generally to industrial process control and automation systems and other systems using fluidized catalytic cracking (FCC) pre-treatment units. More specifically, this disclosure relates to an apparatus and method for harnessing machine learning and data analytics for a real-time predictive model for a FCC pre-treatment unit.

BACKGROUND

Industrial process control and automation systems are often used to automate large and complex industrial processes. These types of control and automation systems routinely include process controllers and field devices like sensors and actuators. Some of the process controllers typically receive measurements from the sensors and generate control signals for the actuators.

Model-based industrial process controllers are one type of process controller routinely used to control the operations of industrial processes. Model-based process controllers typically use one or more models to mathematically represent how one or more properties within an industrial process respond to changes made to the industrial process. Model-based controllers typically depend on having accurate models of a process's behavior in order to perform well and effectively control the process. As conditions change in the process, a controller's models typically need to be updated.

SUMMARY

This disclosure provides an apparatus and method for harnessing machine learning and data analytics for a real-time predictive model for a fluidized catalytic cracking (FCC) pre-treatment unit.

In a first embodiment, a method provides for harnessing machine learning and data analytics for a real-time predictive model for a FCC pre-treatment unit. The method includes collecting operating parameters of a pre-treatment unit and FCC unit; evaluating an independent variable of the operating parameters; and adjusting an input to the pre-treatment unit to control the independent variable within specifications in an output of the FCC unit.

In a second embodiment, an apparatus provides for harnessing machine learning and data analytics for a real-time predictive model for a FCC pre-treatment unit. The apparatus includes at least one memory and at least one processor operatively coupled to the at least one memory. The at least one processor collects operating parameters of a pre-treatment unit and FCC unit; evaluates an independent variable of the operating parameters; and adjusts an input to the pre-treatment unit to control the independent variable within specifications in an output of the FCC unit.

In a third embodiment, a non-transitory computer readable medium provides for harnessing machine learning and data analytics for a real-time predictive model for a FCC pre-treatment unit. The non-transitory machine-readable medium is encoded with executable instructions that, when executed, cause one or more processors to collect operating parameters of a pre-treatment unit and FCC unit; evaluate an independent variable of the operating parameters; and adjust an input to the pre-treatment unit to control the independent variable within specifications in an output of the FCC unit.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1-4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Diesel and gasoline specifications require the reduction of sulfur to very low concentrations. The fluid catalytic cracking (FCC) unit is a major source of gasoline in a FCC refinery. A FCC feed pre-treatment operation, placed upstream of the FCC unit, improves the performance of the FCC unit and is an excellent way of meeting the required sulfur levels in gasoline. The degree of desulphurization in a FCC pre-treatment unit is observed by varying the temperature of the reactor, which is controlled by upstream heater firing. However, the FCC pre-treatment reactor temperature variation based on a downstream FCC unit gasoline product sulfur level is currently not available.

This disclosure applies a predictive model by harnessing data analytics and machine learning concepts with real time operating data to vary the pre-treatment reactor temperature with product sulfur level/specification. The disclosure describes controlling the FCC pre-treatment reactor temperature by using FCC gasoline product sulfur levels with the use of a real time algorithm, and not within the unit. This disclosure also describes predicting the FCC gasoline product sulfur level based on FCC pre-treatment feed sulfur levels by the use of a model algorithm built using real time data.

Figure 1:
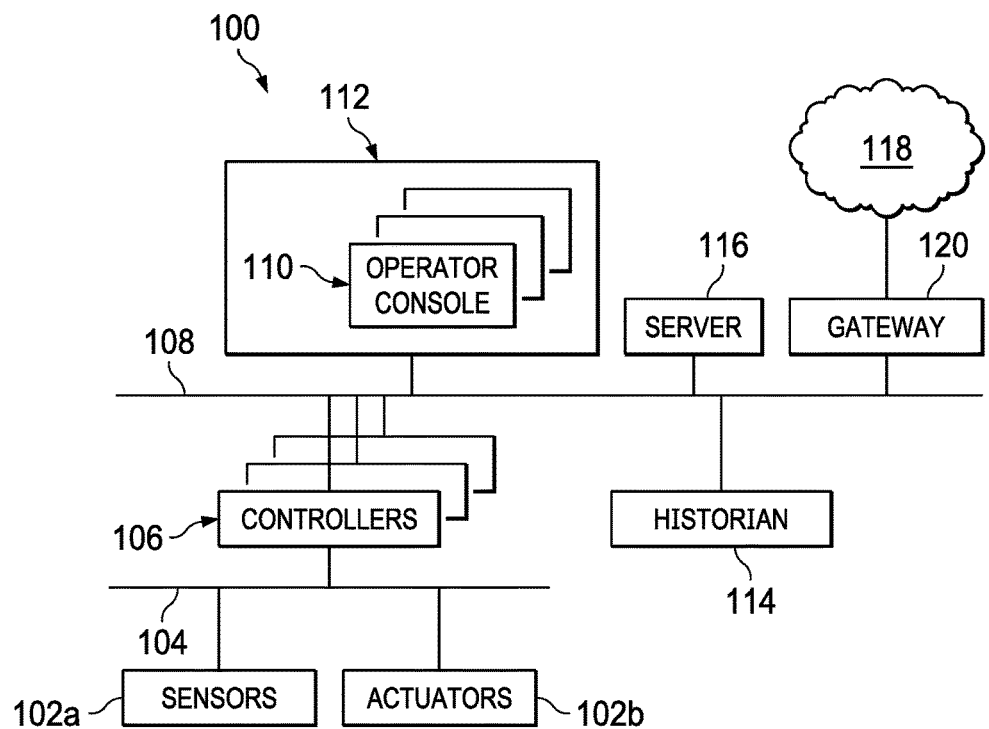
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as flow, pressure, or temperature. Also, the actuators 102b could alter a wide variety of characteristics in the process system, such as valve openings. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network (such as one supporting a FOUNDATION FIELDBUS protocol), electrical signal network (such as a HART network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions. The controllers 106 could therefore support a combination of approaches, such as regulatory control, advanced regulatory control, supervisory control, and advanced process control.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control (MPC) or other advanced predictive control (APC). As a particular example, each controller 106 could represent a computing device running a real-time operating system, a WINDOWS operating system, or other operating system.

At least one network 108 couples the controllers 106 and other devices in the system 100. The network 108 facilitates the transport of information between components. The network 108 could represent any suitable network or combination of networks. As particular examples, the network 108 could represent at least one Ethernet network.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could also receive information affecting how the industrial process is controlled, such as by receiving setpoints or control modes for process variables controlled by the controllers 106 or other information that alters or affects how the controllers 106 control the industrial process. Each operator console 110 includes any suitable structure for displaying information to and interacting with an operator. For example, each operator console 110 could represent a computing device running a WINDOWS operating system or other operating system.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

The control and automation system 100 here also includes at least one historian 114 and one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100.

Each server 116 denotes a computing device that executes applications for users of the operator consoles 110 or other applications. The applications could be used to support various functions for the operator consoles 110, the controllers 106, or other components of the system 100. Each server 116 could represent a computing device running a WINDOWS operating system or other operating system. Note that while shown as being local within the control and automation system 100, the functionality of the server 116 could be remote from the control and automation system 100. For instance, the functionality of the server 116 could be implemented in a computing cloud 118 or a remote server communicatively coupled to the control and automation system 100 via a gateway 120.

At least one component of the system 100 could support a mechanism for harnessing machine learning and data analytics for a real-time predictive model for a FCC pretreatment unit. For example, this functionality could be implemented in an operator console 110, a server 116, or a computing cloud 118 or remote server.

Although FIG. 1 illustrates one example of an industrial process control and automation system 100, various changes may be made to FIG. 1. For example, the system 100 could include any number of sensors, actuators, controllers, networks, operator consoles, control rooms, historians, servers, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment where harnessing machine learning and data analytics for a real-time predictive model for a FCC pre-treatment unit of model-based industrial process controllers can be used. This functionality can be used in any other suitable system.

Figure 2:
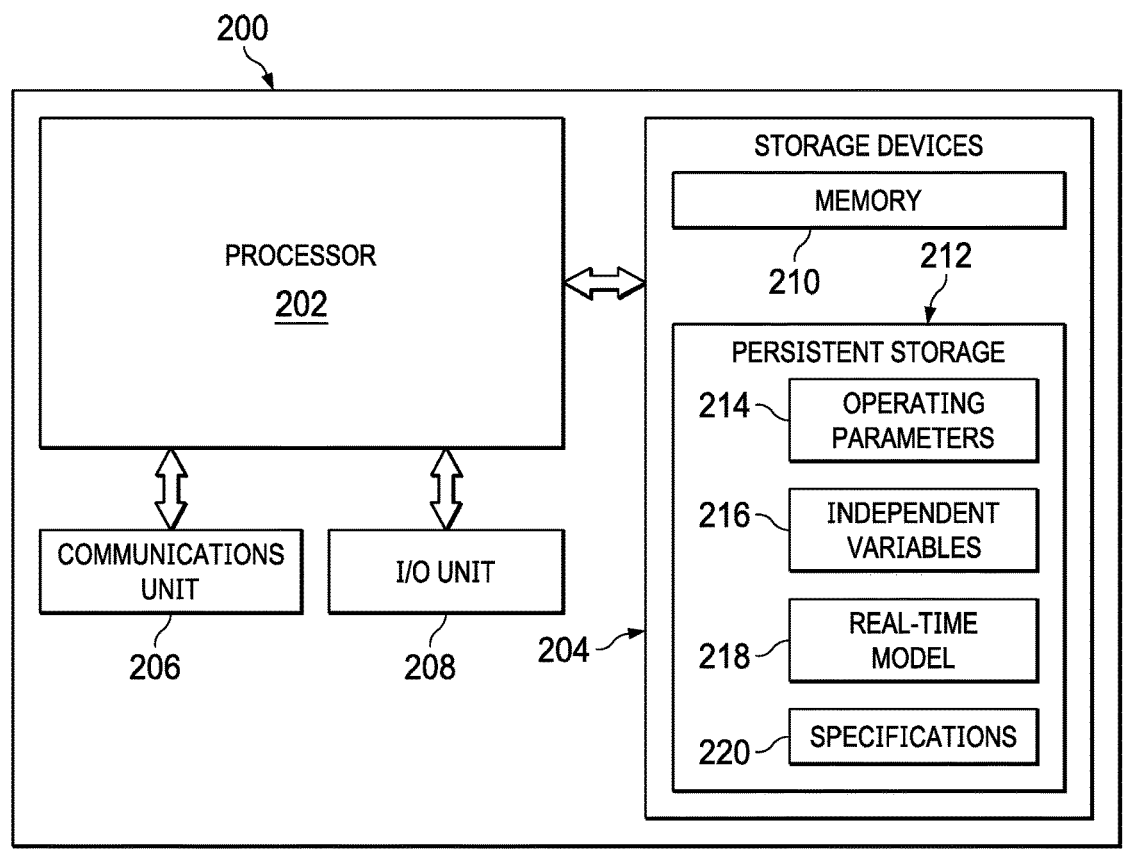
FIG. 2 illustrates an example device for harnessing machine learning and data analytics for a real-time predictive model for a FCC pre-treatment unit of model-based industrial process controllers according to this disclosure.

FIG. 2 illustrates an example device 200 for harnessing machine learning and data analytics for a real-time predictive model for a FCC pre-treatment unit of model-based industrial process controllers according to this disclosure. The device 200 could, for example, denote an operator console 110, server 116, or device used in the computing cloud 118 described above with respect to FIG. 1. However, the device 200 could be used in any other suitable system.

As shown in FIG. 2, the device 200 includes at least one processor 202, at least one storage device 204, at least one communications unit 206, and at least one input/output (I/O) unit 208. Each processor 202 can execute instructions, such as those that may be loaded into a memory 210. The instructions could harness machine learning and data analytics for a real-time predictive model for a FCC pre-treatment unit of model-based industrial process controllers. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc. The persistent storage 212 could store operating parameters 214, independent variables 216, real-time models 218, and specifications 220.

The communications unit 206 supports communications with other systems or devices. For example, the communications unit 206 could include a network interface card or a wireless transceiver facilitating communications over a wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Although FIG. 2 illustrates one example of a device 200 for harnessing machine learning and data analytics for a real-time predictive model for a FCC pre-treatment unit of model-based industrial process controllers, various changes may be made to FIG. 2. For example, components could be added, omitted, combined, further subdivided, or placed in any other suitable configuration according to particular needs. Also, computing devices can come in a wide variety of configurations, and FIG. 2 does not limit this disclosure to any particular configuration of computing device.

Figure 3:
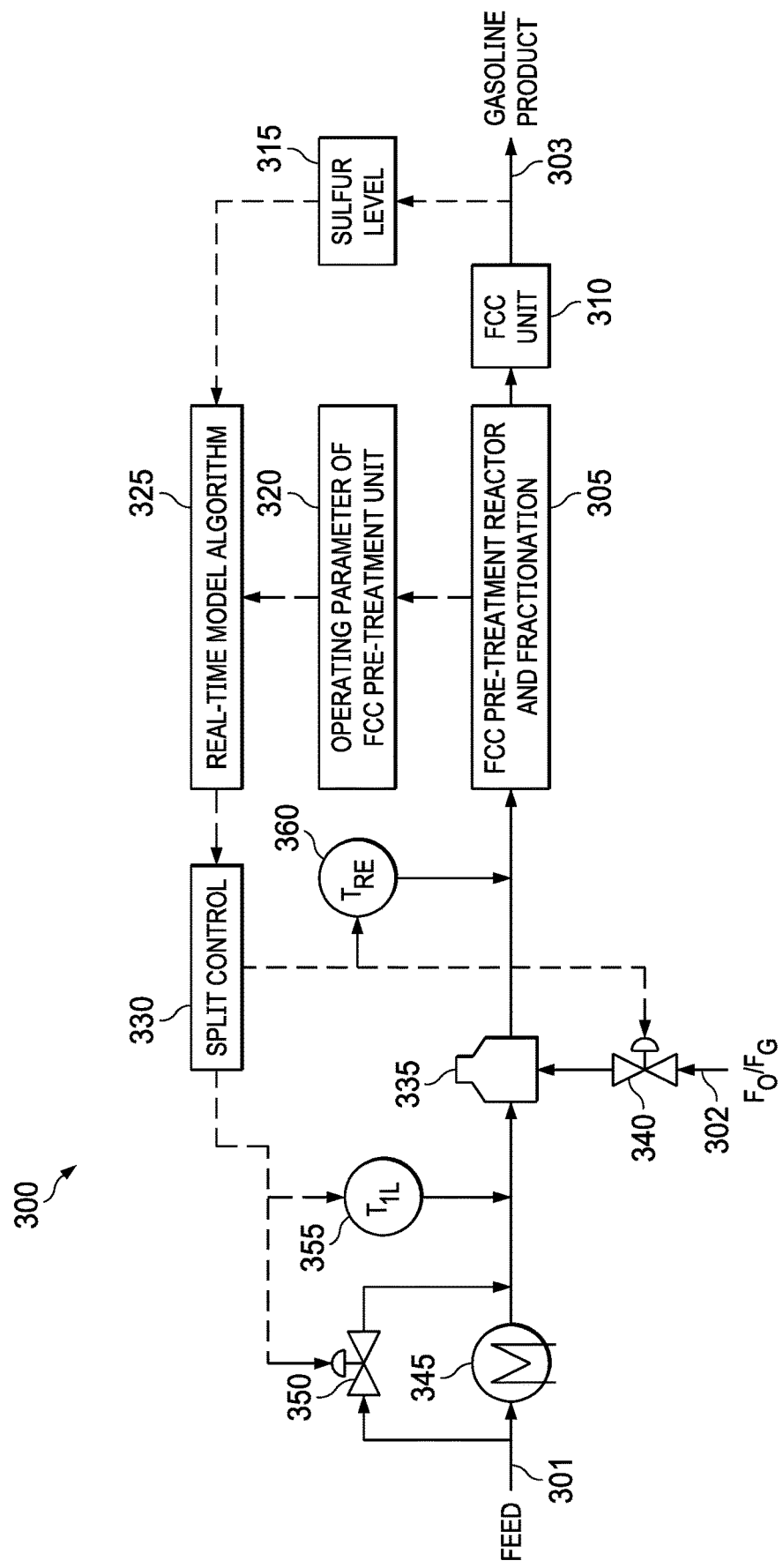
FIG. 3 illustrates an example schematic for a FCC pre-treatment unit of model-based industrial process controllers according to this disclosure.

FIG. 3 illustrates an example schematic for a FCC system 300 with a FCC pre-treatment unit 305 of model-based industrial process controllers according to this disclosure. The embodiment of the FCC system 300 illustrated in FIG. 3 is for illustration only. FIG. 3 does not limit the scope of this disclosure to any particular implementation of an FCC system.

The FCC system 300 receives feed 301 and furnace fuel 302 and outputs gasoline product 303. The FCC system 300 includes an FCC pre-treatment unit 305, an FCC unit 310, a sulfur sensor 315, an operating parameter controller 320, a real-time model algorithm controller 325, a split controller 330, a boiler 335, a boiler input valve 340, a heat exchanger 345, a heat exchanger bypass valve 350, a boiler temperature controller 355 and a reactor temperature controller 360. The FCC system 300 receives heavy hydrocarbons (feed 301) and through the cracking process produce lighter products that are more valuable (gasoline products 303). The controllers described herein can be implemented as processors.

The FCC pre-treatment unit 305 is upstream before the FCC unit 310 and after the boiler 335. The FCC pre-treatment unit 305 provides a level of desulphurization based on a input temperature of the feed 301 output from the boiler 335. The FCC pre-treatment unit can include a reactor or a fractionator.

The FCC unit 310 performs fluid catalytic cracking (FCC). In the FCC process, the feed 301 is heated to a high temperature and pressurized to a moderate pressure for the FCC unit 310 and brought into contact with a catalyst. Vapor is collected when the catalysts break down the long-chain molecules of the feed 301.

The sulfur sensor 315 is located downstream of the FCC unit 310. The sulfur sensor determines an amount or percentage of sulfur that is contained within the gasoline product 303. The sulfur sensor 315 transmits the sulfur level to the real-time model algorithm controller 325

The operating parameter controller 320 receives the operating parameters of the FCC pre-treatment unit 305. The operating parameter controller 320 uses the operating parameters to estimate a sulfur level of the gasoline product 303. The estimated sulfur level is then sent to the real-time model algorithm with the operating parameters of the FCC pre-treatment unit 305

The real-time model algorithm controller 325 receives the operating parameters and the estimated sulfur level from the operating parameter controller 320 and the actual sulfur level. The algorithm controller 325 processes the parameters, estimated sulfur level and actual sulfur level to determine the operating parameters of the boiler input valve 340, the heat exchanger bypass valve 350, the boiler temperature controller 355 and the reactor temperature controller 360. The algorithm controller 325 transmits the operating parameters to the split controller 330.

The split controller 330 operates the bypass valve 350, the boiler temperature controller 355, the boiler input valve 340, and the reactor temperature controller 360 according to the output of the real-time model algorithm controller 325. The split controller 330 receives the operating parameters from the algorithm controller 325 and determines which component of the FCC system is controlled by each operating parameter. The split controller 330 transmits the respective operating parameters to each of the bypass valve 350, the boiler temperature controller 355, the boiler input valve 340, and the reactor temperature controller 360.

The boiler 335 receives the feed 301 after the heat exchanger 345 and bypass valve 350 and receives oil fuel ($F_O$) or gas fuel ($F_G$) through the boiler input valve 340. The boiler 335 is controlled by the boiler temperature controller 355. The temperature is based on the algorithm controller 325 determining an optimal temperature or temperature adjustment for reducing the sulfur level in the gasoline product 303.

The boiler input valve 340 controls the amount of fuel 302 that is received by the boiler 335. The boiler input valve 340 is controlled by the operating parameters determined by the algorithm controller 325.

The heat exchanger 345 adjusts the temperature of the feed before the boiler 335. The heat exchanger 345 receives a portion of the feed 301. The portion could be an entire portion or no portion. The heat exchanger 345 outputs the treated feed 301 to the boiler 335.

The heat exchanger bypass valve 350 controls the amount of the feed 301 that passes through the heat exchanger 345. The bypass valve 350 can allow a remaining portion of the feed to flow to the boiler 335 without passing through the heat exchanger 345. The output of the bypass valve 350 can be combined with the output of the heat exchanger 345 before being input to the boiler 335, or separately input to the boiler 335 and combined in the boiler 335 itself.

The boiler temperature controller 355 adjusts the temperature in the boiler 335. The boiler temperature can be constantly adjusted in real-time according to the results of the algorithm controller 325. The temperature of the boiler 335 in combination with the FCC pre-treatment unit 305 affects the sulfur level of the gasoline product 303.

The reactor temperature controller 360 adjust the temperature of the FCC pre-treatment unit 305. The reactor or fractionation temperatures can both be constantly and independently adjusted in real-time according to the results of the algorithm controller 325. The temperature of the FCC pre-treatment unit 305 in combination with the boiler 335 affects the sulfur level of the gasoline product 303.

Figure 4:
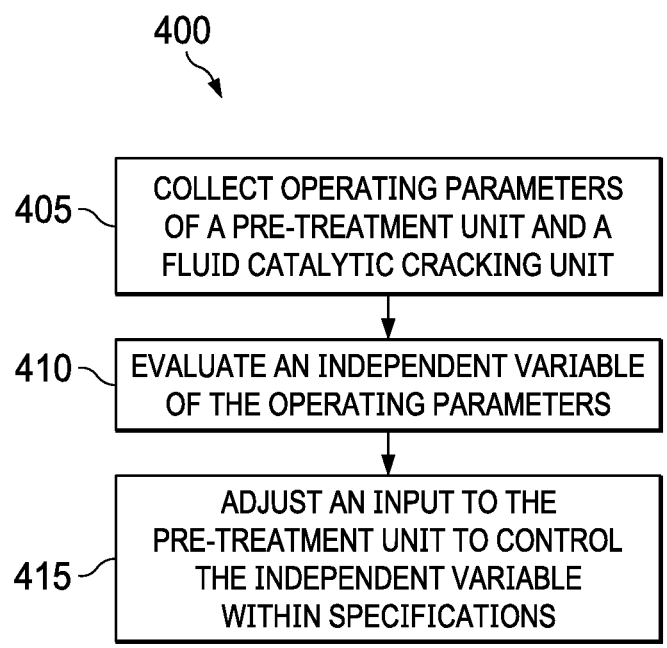
FIG. 4 illustrates an example process for a FCC pre-treatment unit of model-based industrial process controllers according to this disclosure.

FIG. 4 illustrates an example process 400 for a FCC pre-treatment unit of model-based industrial process controllers according to this disclosure. For example, the process depicted in FIG. 4 may be performed by the device 200 in FIG. 2. The process may also be implemented by the system 300 in FIG. 3.

In operation 405, device 200 collects operating parameters of a pre-treatment unit and a fluid catalytic cracking (FCC) unit.

In operation 410, device 200 evaluates an independent variable of the operating parameters. The independent variable can be evaluated for being within a range of specifications. The specifications require A real-time model can be developed to evaluate the independent variable. The real-time model can be developed using data analytics to develop a correlation between a change of the input and the independent variable. The real-time model can be updated with the operating parameters in real-time. The input can be adjusted using a machine learning capability based on the real-time model.

In certain embodiments, the independent variable is a concentration of sulfur in FCC gasoline.

An estimated sulfur level can be determined from the operating parameters. The estimated sulfur level can also be determined based on the following equation:

$$Ln(Sg) = 0.905 * Ln(Sf) - 2.5$$

where Sg is an estimated sulfur level by weight percentage in a gasoline product and Sf is a sulfur level measured by weight percentage in a feed.

In operation 415, device 200 adjusts an input to the pre-treatment unit to control the independent variable within specifications in an output of the FCC unit. The input can include a percentage of feed flow diverted from the heat exchanger, a temperature adjustment in the boiler, a fuel flow adjustment to the boiler, a temperature adjustment for the pre-treatment unit, etc. The adjustments to the input affect the level of sulfur that is output from the FCC unit.

The input can include a pre-treatment reactor temperature. The temperature is adjusted by varying an inlet exchanger bypass valve and a heater fuel gas valve.

Although FIG. 4 illustrates an example process 400 for a FCC pre-treatment unit of model-based industrial process controllers, various changes could be made to FIG. 4. For example, while shown as a series of steps, various steps in each figured could overlap, occur in parallel, occur in a different order, or occur multiple times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
 collecting operating parameters of a pre-treatment unit and fluid catalytic cracking (FCC) unit;
 developing a real-time model to evaluate an independent variable of the operating parameters;
 adjusting an input to the pre-treatment unit to control the independent variable within specifications in an output of the FCC unit,
 wherein the real-time model is developed using data analytics to develop a correlation between a change of the input and the independent variable;
 the real-time model is updated with the operating parameters in real-time; and
 the input is adjusted using a machine learning capability based on the real-time model.

2. The method of claim 1, wherein the independent variable is a concentration of sulfur in FCC gasoline.

3. The method of claim 2, wherein:
 an estimated sulfur level is determined from the operating parameters, and
 the estimated sulfur level is determined by the following equation:

$$Ln(Sg)=0.905*Ln(Sf)-2.5,$$

where Sg is an estimated sulfur level by weight percentage in a gasoline product and Sf is a sulfur level measured by weight percentage in a feed.

4. The method of claim 1, wherein:
 the input includes a pre-treatment reactor temperature; and
 the pre-treatment reactor temperature is adjusted by varying an inlet exchanger bypass valve and a heater fuel gas valve.

5. An apparatus comprising:
 at least one memory; and
 at least one processor operatively coupled to the at least one memory, the at least one processor configured to:
  collect operating parameters of a pre-treatment unit and fluid catalytic cracking (FCC) unit;
  develop a real-time model to evaluate an independent variable of the operating parameters;
  adjust an input to the pre-treatment unit to control the independent variable within specifications in an output of the FCC unit,
  wherein the real-time model is developed using data analytics to develop a correlation between a change of the input and the independent variable;
  the real-time model is updated with the operating parameters in real-time; and
  the input is adjusted using a machine learning capability based on the real-time model.

6. The apparatus of claim 5, wherein the independent variable is a concentration of sulfur in FCC gasoline.

7. The apparatus of claim 6, wherein:
 an estimated sulfur level is determined from the operating parameters, and
 the estimated sulfur level is determined by the following equation:

$$Ln(Sg)=0.905*Ln(Sf)-2.5,$$

where Sg is an estimated sulfur level by weight percentage in a gasoline product and Sf is a sulfur level measured by weight percentage in a feed.

8. The apparatus of claim 5, wherein:
 the input includes a pre-treatment reactor temperature; and
 the pre-treatment reactor temperature is adjusted by varying an inlet exchanger bypass valve and a heater fuel gas valve.

9. A non-transitory computer readable medium containing instructions that, when executed by at least one processing device, cause the at least one processing device to:
 collect operating parameters of a pre-treatment unit and fluid catalytic cracking (FCC) unit;
 a real-time model to evaluate an independent variable of the operating parameters;
 adjust an input to the pre-treatment unit to control the independent variable within specifications in an output of the FCC unit,
 wherein the real-time model is developed using data analytics to develop a correlation between a change of the input and the independent variable;
 the real-time model is updated with the operating parameters in real-time; and
 the input is adjusted using a machine learning capability based on the real-time model.

10. The non-transitory computer readable medium of claim 9, wherein the independent variable is a concentration of sulfur in FCC gasoline.

11. The non-transitory computer readable medium of claim 10, wherein:
 an estimated sulfur level is determined from the operating parameters, and
 the estimated sulfur level is determined by the following equation:

$$Ln(Sg)=0.905*Ln(Sf)-2.5,$$

where Sg is an estimated sulfur level by weight percentage in a gasoline product and Sf is a sulfur level measured by weight percentage in a feed.

* * * * *